United States Patent
Shikata

(10) Patent No.: US 7,392,413 B2
(45) Date of Patent: Jun. 24, 2008

(54) CHANGING OF OPERATING VOLTAGE IN SEMICONDUCTOR INTEGRATED CIRCUIT

(75) Inventor: Takashi Shikata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 472 days.

(21) Appl. No.: 10/967,192

(22) Filed: Oct. 19, 2004

(65) Prior Publication Data

US 2005/0283630 A1 Dec. 22, 2005

(30) Foreign Application Priority Data

Jun. 21, 2004 (JP) .............................. 2004-182467

(51) Int. Cl.
*G06F 1/32* (2006.01)
(52) U.S. Cl. .......................... 713/321; 713/322; 714/10; 324/537
(58) Field of Classification Search ................. 713/321, 713/322; 324/537; 702/117; 714/10
See application file for complete search history.

(56) References Cited

U.S. PATENT DOCUMENTS

| | | | | |
|---|---|---|---|---|
| 6,035,357 A | * | 3/2000 | Sakaki | ........................ 710/301 |
| 6,772,356 B1 | * | 8/2004 | Qureshi et al. | ............... 713/321 |
| 6,963,992 B1 | * | 11/2005 | Cheng et al. | ................. 713/501 |
| 7,010,724 B1 | * | 3/2006 | Hicok | .......................... 714/39 |
| 2004/0054936 A1 | * | 3/2004 | Dwyer et al. | ................. 713/300 |

FOREIGN PATENT DOCUMENTS

| | | |
|---|---|---|
| JP | 2001-034502 | 2/1991 |
| JP | 11-203163 | 7/1999 |
| JP | 11-296243 | 10/1999 |
| JP | 2000-112560 | 4/2000 |
| JP | 2002-543513 | 12/2002 |
| WO | WO 00/67102 | 11/2000 |

OTHER PUBLICATIONS

Abrahamsen et al.—"Automatic Regulation of Processor Frequency for Personal Compputers"—Sep. 1994—IBM TDB—vol. 37—No. 09—pp. 325-328.*
Dynamic Power Management for Embedded Systems, [online], Nov. 19, 2002, IBM, [searched on Apr. 27, 2004,], Internet UrL: http://www.research.ibm.com/arl/projects/DPM_V1.1.pdf.
Japanese Office Action issued in priority Japanese Application No. 2004-182467.

* cited by examiner

*Primary Examiner*—Thuan N Du
(74) *Attorney, Agent, or Firm*—Staas & Halsey LLP

(57) ABSTRACT

A semiconductor integrated circuit includes a module configured to operate based on a clock signal, a voltage controlling unit configured to change a power supply voltage supplied to the module, a clock generating unit configured to supply the clock signal to the module, and a test circuit configured to operate at the power supply voltage based on the clock signal to emulate a delay of a critical path provided in the module, thereby testing whether the module properly operates at the power supply voltage, wherein the clock generating unit supplies a different signal, in place of the clock signal, to the module while the voltage controlling unit is changing the power supply voltage.

18 Claims, 14 Drawing Sheets

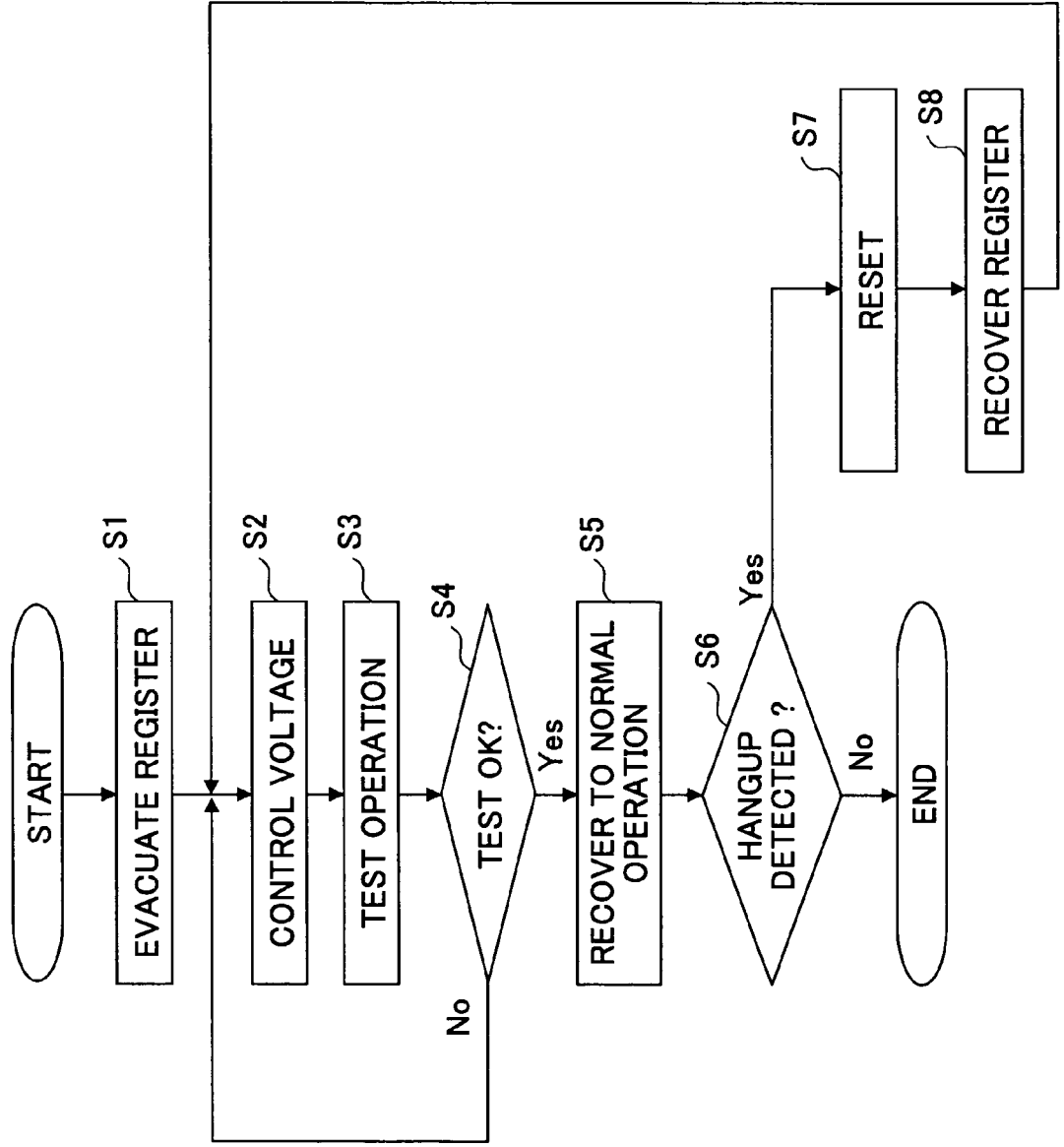

CHANGING OF OPERATING VOLTAGE IN SEMICONDUCTOR INTEGRATED CIRCUIT

CROSS-REFERENCE TO RELATED APPLICATIONS

The present application is based upon and claims the benefit of priority from the prior Japanese Patent Application No. 2004-182467 filed on Jun. 21, 2004, with the Japanese Patent Office, the entire contents of which are incorporated herein by reference.

BACKGROUND OF THE INVENTION

1. Field of the Invention

The present invention generally relates to semiconductor integrated circuits, and particularly relates to a semiconductor integrated circuit in which an internal operating voltage is changed.

2. Description of the Related Art

In order to reduce the power consumption of semiconductor integrated circuits, voltage levels are generally optimized. With the development of the semiconductor process technology, processors or the like are now manufactured with a technology that achieves fine patterns such as 0.13 micrometers or less. In such a case, leak currents that are conventionally regarded as errors account for a significant proportion that can no longer be ignored. The leak currents not only flow all the time regardless of the active/inactive operating state of processors, but also have such characteristics that the amount of currents increases in response to a rise in the internal operating voltage. Further, an increase in chip temperature responsive to the rise of the operating voltage also results in an increase in the leak currents. Because of this, the presence of leak currents is a major issue that needs to be addressed to achieve low power consumption.

In order to keep the influence of leak currents to a minimum, a generally employed method lowers the internal operating voltage to reduce the leak currents during a period in which the processor or the like do not need to operate at high speed, and raises the internal voltage during a period in which high-speed operation is required. In such technology, the voltage level may not be changed at once from a given voltage level to another voltage level, but may be changed gradually in a stepwise manner by the units of small voltage steps while spending an extended period of time, thereby keeping the influence of voltage changes to a minimum. In order to implement such voltage control, there is a need for a chip to be informed of the lower voltage limit at which proper operation is possible. When the internal operating voltage is to be lowered, the control of voltages has to insure that the internal operating voltage does not drop below this lower voltage limit. If the voltage goes down below this lower voltage limit, the delay of semiconductor devices making up the processor increases, thereby presenting a risk of the processor failing to properly perform the execution of instructions and thus suffering a hangup.

Patent Document 1 discloses an invention that provides a voltage testing circuit for an operation unit inside a CPU, and that tests the operation unit while lowering the voltage little by little, thereby determining the lowest voltage at which the operation unit can properly operate. Patent Document 2 discloses a technology that can be used to obtain optimum voltage levels supplied to a plurality of processors implemented on a system board. A voltage margin test is conducted with respect to each of the processors at the time of power-on of the system, thereby supplying optimum voltage levels from the voltage source to each of the processors.

Further, Non-patent Document 1 shoes a general trend of recent technologies regarding the dynamic control of an operating frequency and an internal operating voltage of a processor by use of program instructions in response to a required performance level.

[Patent Document 1] Japanese Patent Application Publication No. 11-203163

[Patent Document 2] Japanese Patent Application Publication No. 2001-34502

[Non-patent Document 1] "Dynamic Power Management for Embedded Systems", [online], Nov. 19, 2002, IBM, [searched on 2004, Apr. 27], Internet <URL: http://www.research.ibm.com/arl/projects/papers/DPM_V1.1.pdf>

When the voltage is gradually changed, increasing the internal voltage does not present a problem since a state transition is made toward the improvement of operating conditions of the CPU. Decreasing the internal voltage, on the other hand, presents a risk of the processor failing to perform the execution of instructions and suffering a hangup. Processors manufactured by semiconductor process have performance variation due to process variation. If it is desired to change the internal voltage dynamically while ensuring safety, a voltage range that permits proper operation needs to be identified in advance with respect to individual processors, and the voltage needs to be controlled within this voltage range while maintaining a sufficient margin.

Semiconductor integrated circuits may have the performance thereof deteriorating due to factors such as a temperature increase even during an ongoing operation. A range that permits proper operation may differ depending on operating conditions. A voltage range that is identified under certain operating conditions as permitting proper operation may no longer allow proper operation after a change in the operating conditions. In order to avoid such shortcomings, there may be a need to provide an excessively large margin.

Accordingly, there is a need for a semiconductor integrated circuit that can set an optimum voltage level in response to chip-specific operating characteristics as well as environment-specific real-time operating characteristics so as to prevent malfunctions such as a hangup when changing the operating voltage of a processor dynamically.

SUMMARY OF THE INVENTION

It is a general object of the present invention to provide a semiconductor integrated circuit that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a semiconductor integrated circuit particularly pointed out in the specification in such full, clear, concise, and exact terms as to enable a person having ordinary skill in the art to practice the invention.

To achieve these and other advantages in accordance with the purpose of the invention, the invention provides a semiconductor integrated circuit including a module configured to operate based on a clock signal, a voltage controlling unit configured to change a power supply voltage supplied to the module, a clock generating unit configured to supply the clock signal to the module, and a test circuit configured to operate at the power supply voltage based on the clock signal to emulate a delay of a critical path provided in the module, thereby testing whether the module properly operates at the power supply voltage, wherein the clock generating unit supplies a different signal, in place of the clock signal, to the module while the voltage controlling unit is changing the power supply voltage.

According to another aspect of the invention, a semiconductor integrated circuit includes a core circuit configured to operate based on a clock signal to execute one or more instructions, a voltage controlling unit configured to change a power supply voltage supplied to the core circuit, and a monitor circuit configured to detect a hangup of the core circuit, wherein the core circuit is reset in response to the detection of the hangup by the monitor circuit.

According to at least one embodiment of the invention, the operation of the module such as a core circuit is suppressed in a condition of an unstable voltage level during a power supply voltage change, and the test circuit checks whether a proper operation of the module is ensured prior to an operation following the voltage change. This makes it possible to select an optimum voltage level responsive to chip-specific operating characteristics as well as environment-specific real-time operating characteristics so as to prevent malfunctions such as a hangup of the module when changing the operating voltage of the module dynamically.

According to at least one embodiment of the invention, the core circuit can recover to normal operating conditions through a reset even when the core circuit suffers a hangup for some reason (e.g., power supply noise attributable to an external cause).

BRIEF DESCRIPTION OF THE DRAWINGS

Other objects and further features of the present invention will be apparent from the following detailed description when read in conjunction with the accompanying drawings, in which:

FIG. 14 is a flowchart showing the operation of the processor shown in FIG. 13.

DESCRIPTION OF THE PREFERRED EMBODIMENTS

In the following, embodiments of the present invention will be described with reference to the accompanying drawings.

Figure 1:
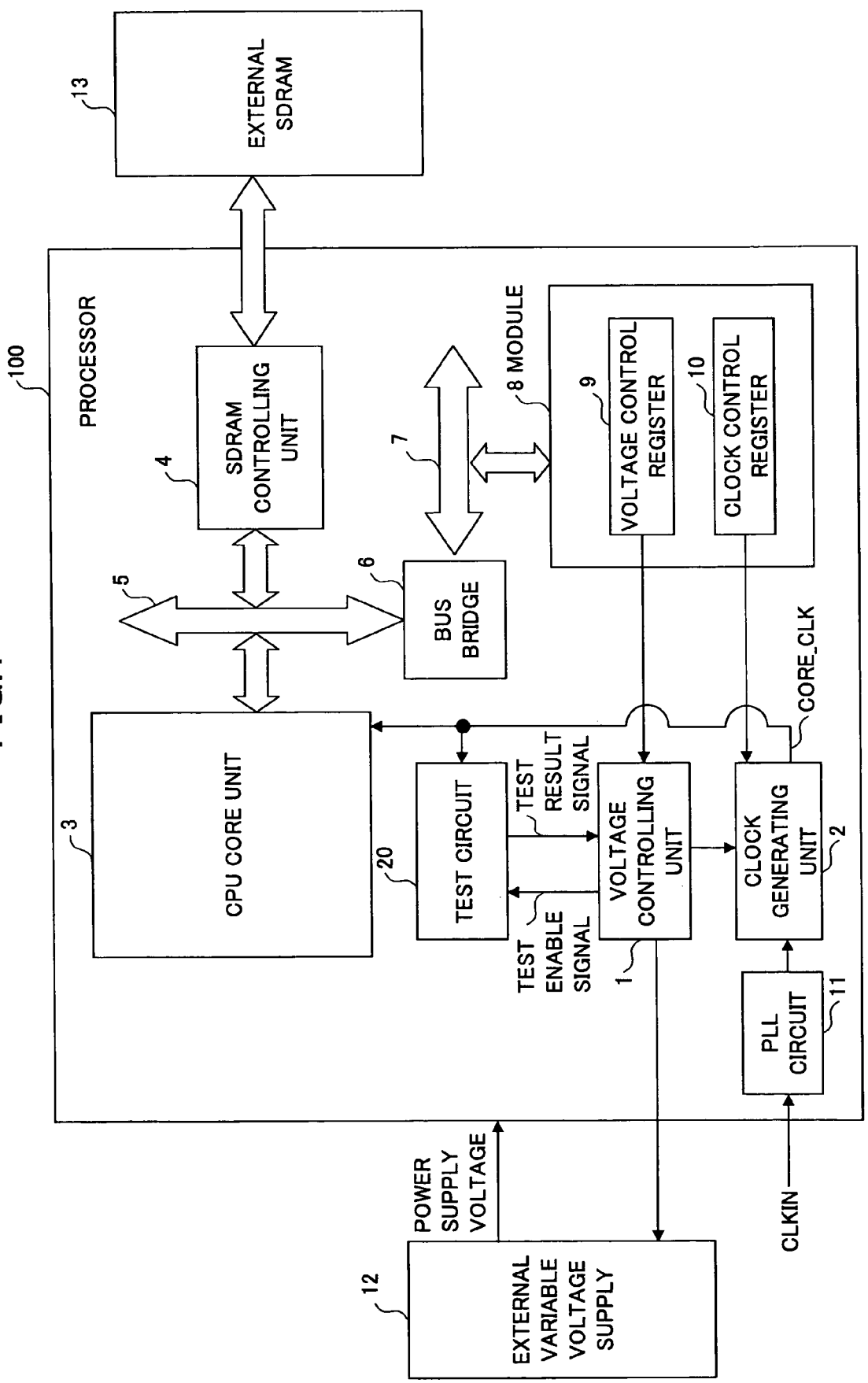
FIG. 1 is a drawing showing an example of the construction of an embodiment of a semiconductor integrated circuit according to the present invention.

FIG. 1 is a drawing showing an example of the construction of an embodiment of a semiconductor integrated circuit according to the present invention. A semiconductor integrated circuit (processor) 100 of FIG. 1 includes a voltage controlling unit 1, a clock generating unit 2, a CPU core unit 3, an SDRAM controlling unit 4, an on-chip bus 5, a bus bridge 6, an internal peripheral bus 7, a module 8, a voltage control register 9, a clock control register 10, a PLL circuit 11, and a test circuit 20. The processor 100 receives a voltage from an external variable voltage supply 12. Moreover, the SDRAM controlling unit 4 of the processor 100 is connected to an external SDRAM 13.

In FIG. 1, the voltage controlling unit 1, the clock generating unit 2, the CPU core unit 3, and the test circuit 20 constitute a portion that directly relates to the present invention, and other units are provided as the illustration of a general construction of a semiconductor integrated circuit, to which the present invention is applied. The SDRAM controlling unit 4 provides an interface with the external SDRAM 13. The bus bridge 6 provides an interface between the on-chip bus 5 and the internal peripheral bus 7. In the module 8, the voltage control register 9 stores settings for controlling the operation of the voltage controlling unit 1 by use of software. The clock control register 10 stores settings for controlling the clock speed and clock supply/suspension of the clock generating unit 2 by use of software. These registers are accessible through buses by the CPU core unit 3, and are controlled by program instructions executed in the CPU core unit 3. The PLL circuit 11 generates a frequency-multiplied clock signal synchronized with a clock signal CLKIN supplied from an exterior, and supplies the generated clock signal to the clock generating unit 2.

The operating voltage of the processor 100 is supplied from the external variable voltage supply 12. It is possible to control the operating voltage of the processor 100 by controlling the external variable voltage supply 12 through a control signal output from the voltage controlling unit 1 of the processor 100. The clock generating unit 2 of the processor 100 generates operating clock signals for provision to individual modules including a core clock signal CORE_CLK supplied to the CPU core unit 3 based on the multiplied-frequency clock signal supplied from the PLL circuit 11.

Figure 2:
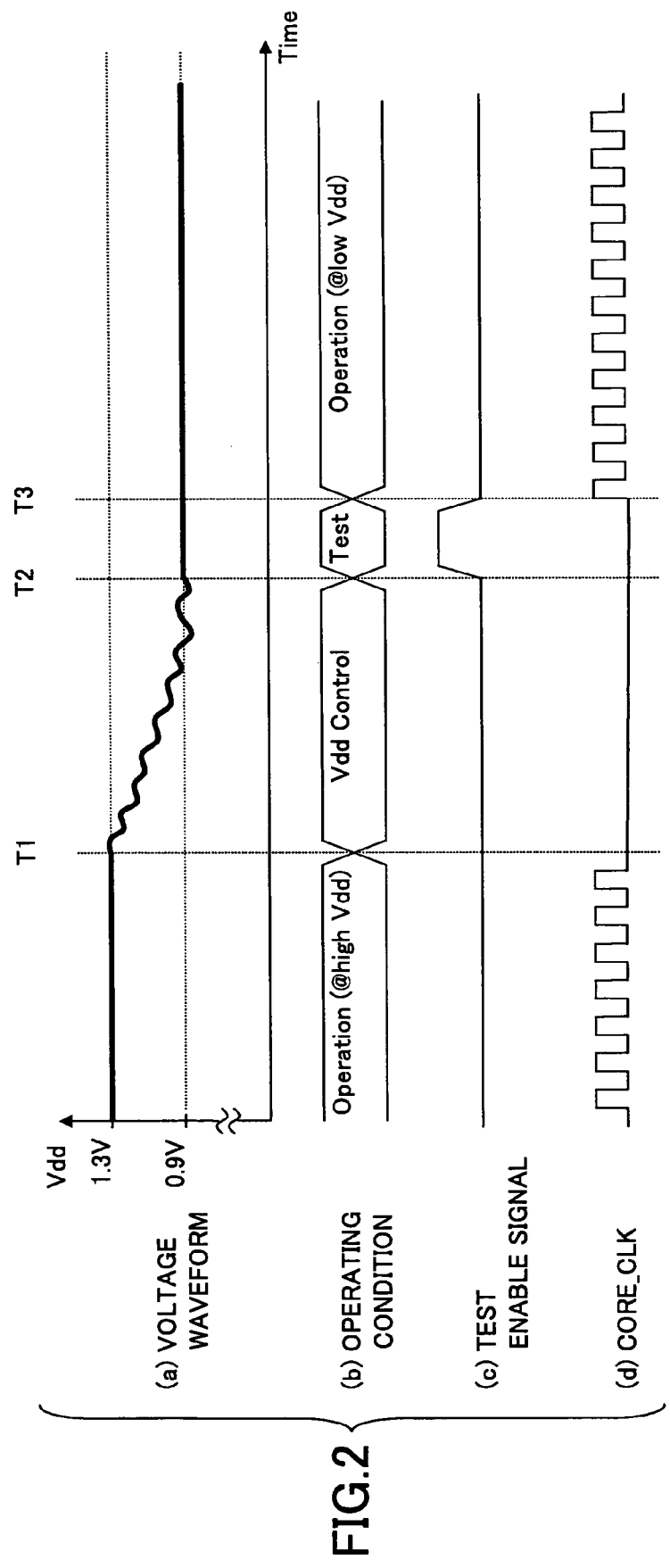
FIG. 2 is a timing chart showing an example of an embodiment of a voltage control operation performed by the semiconductor integrated circuit shown in FIG. 1.

FIG. 2 is a timing chart showing an example of an embodiment of a voltage control operation performed by the semiconductor integrated circuit shown in FIG. 1.

In FIG. 2, a letter designation (a) indicates a voltage change at the time of voltage control wherein the horizontal axis represents time and the vertical axis represents an internal operating voltage Vdd of the processor 100. In this example, the operating voltage is changed from 1.3 V corresponding to a high-speed operation to 0.9 V corresponding to a case where heavy CPU processing is not required. As shown in (b), the processor 100 operates at high speed until time T1. During this period, as shown in (d), the core clock signal CORE_CLK continues to be supplied to the CPU core unit 3. Clock supply to other internal modules may be the same.

Thereafter, an instruction indicative of a shift to a low voltage is written in the voltage control register 9 by the OS or the like that controls the processor 100. In response, the voltage controlling unit 1 supplies a clock stop control signal to the clock generating unit 2. In response to the clock stop control signal, the clock generating unit 2 stops the supply of the core clock signal CORE_CLK. The clock of the CPU core unit 3 that operates at the fastest speed in the processor 100 is suspended in this manner, thereby preventing the hangup of execution of instructions or the like caused by unstable internal voltage during the voltage change. When this is done, clock supply to other modules in addition to the CPU core unit 3 may be suspended, or may be continued. If provision is made to continue clock supply to the SDRAM controlling unit 4 which controls the external SDRAM 13, for example, there is advantageously no need to make the external SDRAM 13 shift to a self-refresh mode or the like.

In FIG. 2, during a period from time T1 to time T2, the voltage controlling unit 1 controls the external variable voltage supply 12 so as to lower the internal operating voltage Vdd gradually. After the internal operating voltage drops to and stabilizes at 0.9 V as intended, the voltage controlling unit 1 asserts a test enable signal during a period from T2 to T3. In response to the assertion of the test enable signal, the test circuit 20 performs a test operation in the period from T2 to T3.

The test circuit 20 supplies a test result signal indicative of the results of the operation test (NG or OK) to the voltage controlling unit 1.

If the test result indicates OK, the voltage controlling unit 1 deactivates a clock-mask request directed to the clock generating unit 2. In response, the clock generating unit 2 starts clock supply by use of a new voltage level after the voltage change, thereby resuming the operation of the CPU core unit 3.

FIG. 2 shows a case in which the internal voltage is lowered. The same processing procedure is applicable when the internal voltage is raised. When the internal voltage is raised, however, there is a smaller possibility of the occurrence of a hangup because a change is made in such a direction that the operating conditions of the CPU core unit 3 improve.

Moreover, there is no need to limit the period of clock supply suspension to the period between T1 and T2 in which the voltage is unstable as shown in FIG. 2. If the power supply voltage of the PLL circuit 11 on the chip is also changed, for example, clock supply may continue to be suspended until the oscillation of the PLL circuit 11 stabilizes after the stabilization of the voltage level.

Moreover, FIG. 1 is depicted, for the sake of illustration, such that the core clock signal CORE_CLK is supplied to the CPU core unit 3 and the test circuit 20 by use of a common signal line extending from the clock generating unit 2. During the period between T2 and T3 shown in FIG. 2, however, it is necessary to supply a clock signal to the test circuit 20 while refraining from supplying a clock signal to the CPU core unit 3. Because of this, it is preferable to provide separate signal paths in an actual construction.

Figure 3:
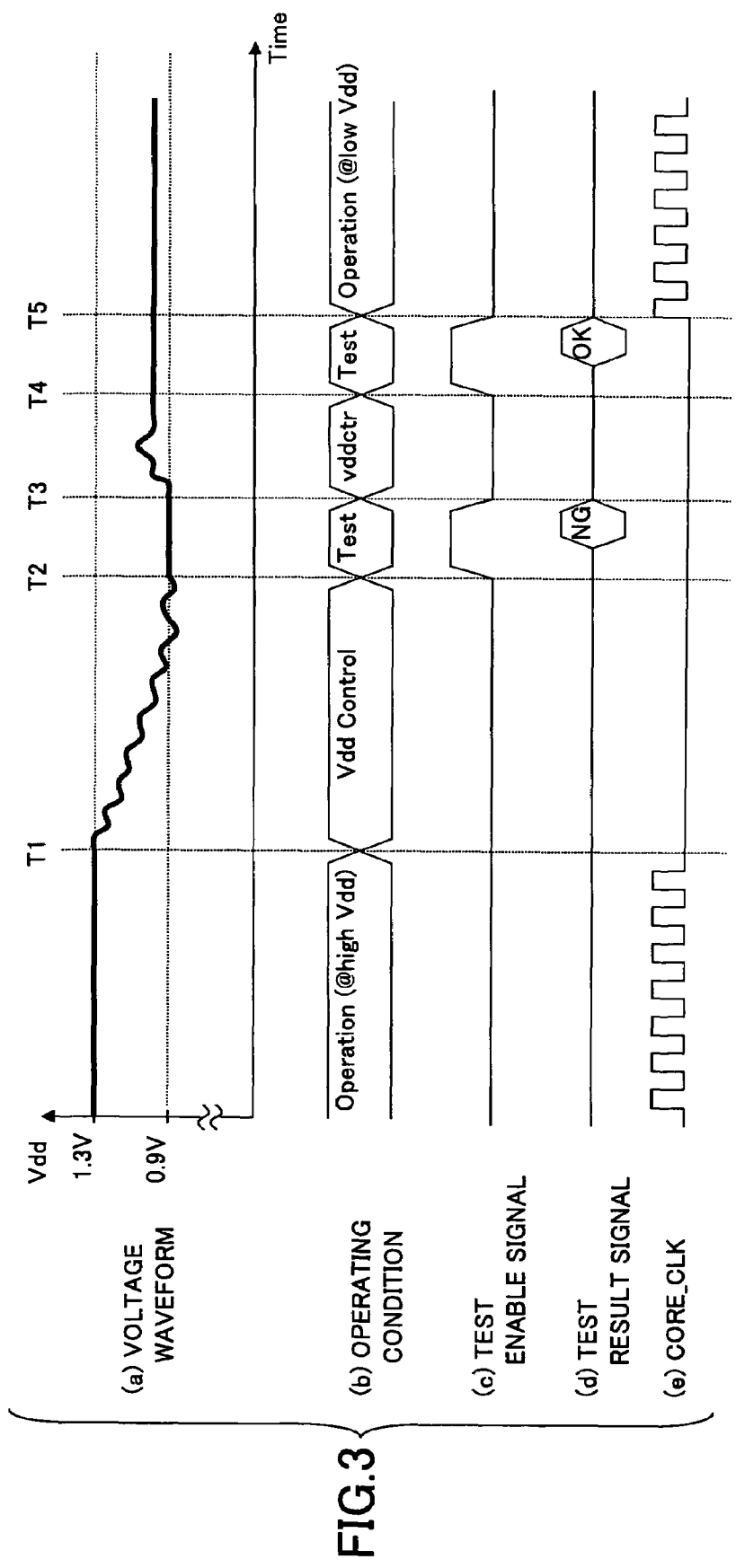
FIG. 3 is a timing chart showing another example of the embodiment of the voltage control operation performed by the semiconductor integrated circuit of FIG. 1.

FIG. 3 is a timing chart showing another example of the embodiment of the voltage control operation performed by the semiconductor integrated circuit of FIG. 1.

In FIG. 3, the voltage controlling unit 1 raises the internal operating voltage during the period T3-T4 if a test result signal obtained from an operation test performed during the period T2-T3 after the voltage change shows NG (poor or negative test result). After this voltage change is completed, the test enable signal is asserted again during the period T4-T5 to perform an operation test. In the example shown in FIG. 3, the test result signal indicates OK (good or positive test result) after the second operation test. In response to this OK test result, the voltage controlling unit 1 deactivates a clock-mask request asserted to the clock generating unit 2. In response, the clock generating unit 2 starts clock supply at time T5 by use of a new voltage level after the voltage change, thereby resuming the operation of the CPU core unit 3.

Figure 4:
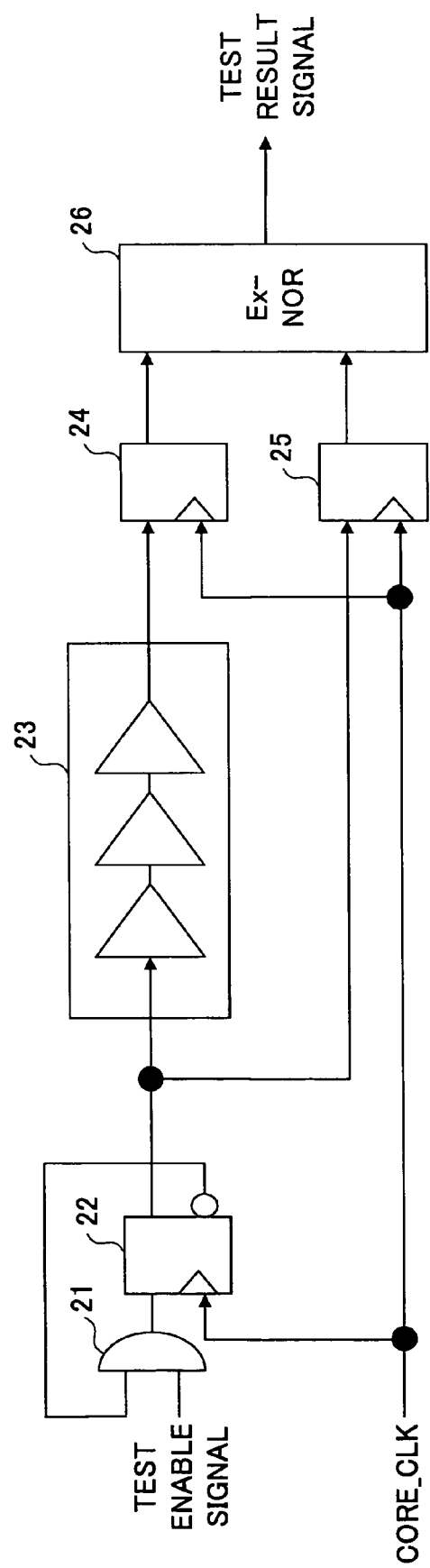
FIG. 4 is a circuit diagram showing an example of the construction of an embodiment of a test circuit.

FIG. 4 is a circuit diagram showing an example of the construction of an embodiment of the test circuit 20.

The test circuit 20 of FIG. 4 includes an AND gate 21, a flip-flop 22, a delay path 23, a flip-flop 24, a flip-flop 25, and an exclusive-NOR gate 26.

The flip-flop 22 operates as a counter for generating a 1-bit toggle signal to generate a test pattern. To be specific, the flip-flop 22 performs a toggle operation with the core clock signal CORE_CLK serving as a trigger if the test enable signal from the voltage controlling unit 1 is HIGH. A test pattern signal generated by the flip-flop 22 is delayed by the delay path 23, and the delayed test pattern signal is latched by the flip-flop 24 in synchronization with the core clock signal CORE_CLK. Further, the test pattern signal generated by the flip-flop 22 is latched by the flip-flop 25 without passing through the delay path 23 in synchronization with the core clock signal CORE_CLK. Data latched by the flip-flop 25 is the correct value (i.e., expected value) of the test pattern. The exclusive-NOR gate 26 compares the value of the flip-flops 24 with the value of the flip-flop 25, and transmits a HIGH test result signal when these two values are the same. If these two values are different from each other, a LOW test result signal is transmitted.

The delay path 23 is comprised of delay buffers, for example, and is configured to have a delay length equivalent to that of a critical path inside the CPU core unit 3 or a delay length longer than that of such critical path by a predetermined delay length. For example, a timing check is performed with respect to the semiconductor integrated circuit constituting the processor 100 of FIG. 1 after its layout is determined, and identifies a path that is the most critical in terms of timing (i.e., the most tight in terms of timing). The delay path 23 is then set to the delay length of this critical path (or such delay value plus a fixed margin). With this provision, the delay path 23 can emulate the delay of the critical path. If the margin of the critical path of the CPU core unit 3 is equivalent to 5% of 1 clock cycle of the core clock signal CORE_CLK, for example, the delay path 23 may be set to a delay length equivalent to 95% of 1 clock cycle (or such delay length plus a fixed margin). Here, the fixed margin is determined by taking into consideration influences such as semiconductor process variation, voltage fluctuation, changes in operating conditions caused by temperature changes, etc.

With the provision described above, a test operation performed by the test circuit 20 following a voltage change makes it possible to determine whether a test pattern signal can be properly latched, the test pattern signal delayed by the path that emulates the critical path under the conditions existent after the voltage change. This makes it possible to check whether a trouble occurs on the actual critical path inside the CPU core unit 3. The test result is OK if the test result signal is HIGH, and is NG if the test result signal is NG.

In this embodiment, the test result signal is comprised of 1 bit. In this case, the voltage controlling unit 1 is able to check the test result by reading a state of the test result signal observed at the time of negating of the test enable signal. In addition to the 1 bit of the test result signal, a signal indicative of the valid period of the test result signal may be transmitted.

The test circuit 20 may be implemented by use of multipliers, adders, etc. When power consumption and circuit size are taken into account, however, the construction as shown in FIG. 4 is practical and preferable.

Figure 5:
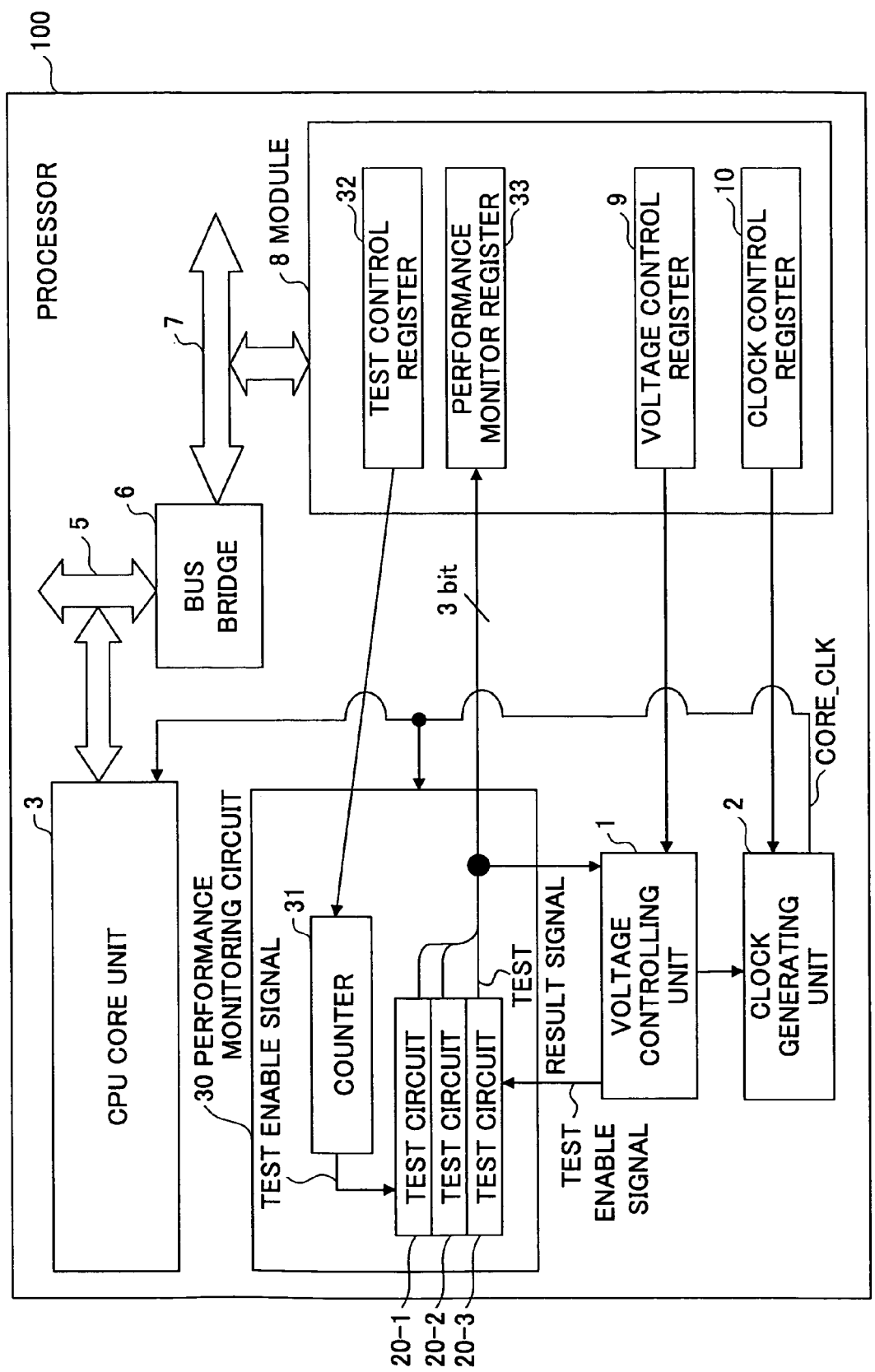
FIG. 5 is a drawing showing an example of the construction of a second embodiment of the processor shown in FIG. 1.

FIG. 5 is a drawing showing an example of the construction of a second embodiment of the processor 100. In FIG. 5, the same elements as those of FIG. 1 are referred to by the same numerals, and a description thereof will be omitted.

In FIG. 5, a performance monitoring circuit 30 is provided in place of the test circuit 20 of FIG. 1. Further, the module 8 is provided with a test control register 32 for storing settings for control of the operation of the performance monitoring circuit 30 and a performance monitor register 33 for storing monitor results obtained by the performance monitoring circuit 30. These registers are accessible through buses by the CPU core unit 3, and are controlled and read according to program instructions executed by the CPU core unit 3.

The performance monitoring circuit 30 includes a counter 31 and a plurality of test circuits 20-1 through 20-3 (three in an illustrated example). Each of the test circuits 20-1 through 20-3 may have the same configuration as the test circuit 20 of FIG. 4. Moreover, the test circuits 20-1 through 20-3 are configured to test 1.1, 1.3, and 1.5 times the delay length of the critical path of the CPU core unit 3, respectively, for example.

The test control register 32 controls the count of the counter 31. The counter 31 generates a test enable signal for activating the test circuits 20-1 through 20-3 when the count reaches a predetermined value. In response to the assertion of the test enable signal from the counter 31 or to the assertion of the test enable signal from the voltage controlling unit 1, the test circuits 20-1 through 20-3 performs a test operation. Respective test result signals output from the test circuits 20-1 through 20-3 are supplied to the voltage controlling unit 1 and the performance monitor register 33.

With the plurality of test circuits 20-1 through 20-3 that perform test operations with respect to respective delay lengths, an operating environment is evaluated under current operating conditions relating to the internal operating voltage and the like. If the test results indicate OK for all the tests performed with respect to 1.1, 1.3, and 1.5 times the delay length of the critical path, for example, it is proper to assess that the operating environment is good. If the test results indicate OK with respect to 1.1 and 1.3 times the delay length, but indicate NG with respect to 1.5 times the delay length, it is ascertained that the operating environment is slightly deteriorating. If the test results indicate OK with respect to 1.1 times the delay length, but indicate NG with respect to 1.3 and 1.5 times the delay length, it is ascertained that the operating environment is further deteriorating.

The plurality of test result signals indicative of these results are supplied to the voltage controlling unit 1, thereby achieving more diligent voltage control compared to the embodiment shown in FIG. 1. Alternatively, only one of the plurality of test result signals may be supplied to the voltage controlling unit 1. In this case, the same voltage control operation as that of the first embodiment shown in FIG. 1 is carried out.

In the present embodiment, further, test results obtained with respect to a plurality of delay lengths are periodically stored in the performance monitor register 33 as monitor results, which are then referred to by a program such as an OS executed by the CPU core unit 3 as such need arises. With this provision, a check as to whether an operating environment is deteriorating is made at appropriate timing (e.g., at constant intervals) by a monitoring operation based on software such as an OS executed by the CPU core unit 3. This check is made even when the operating condition of the CPU core unit 3 fluctuates due to temperature changes or the like while a given internal operating voltage is used. If the operating environment is so deteriorating as to present a danger, a countermeasure may be taken by giving a software instruction to the voltage controlling unit 1 to raise the internal operating voltage, for example.

In this embodiment, it is possible not only to conduct an operation check test (hardware-triggered test) under the condition that the CPU core unit 3 is suspended after a voltage change, but also to conduct a operating environment monitoring test (software-triggered test) under the condition that the CPU core unit 3 is operating. This makes it possible to achieve more flexible control operations for the purpose of reducing power consumption.

Figure 6:
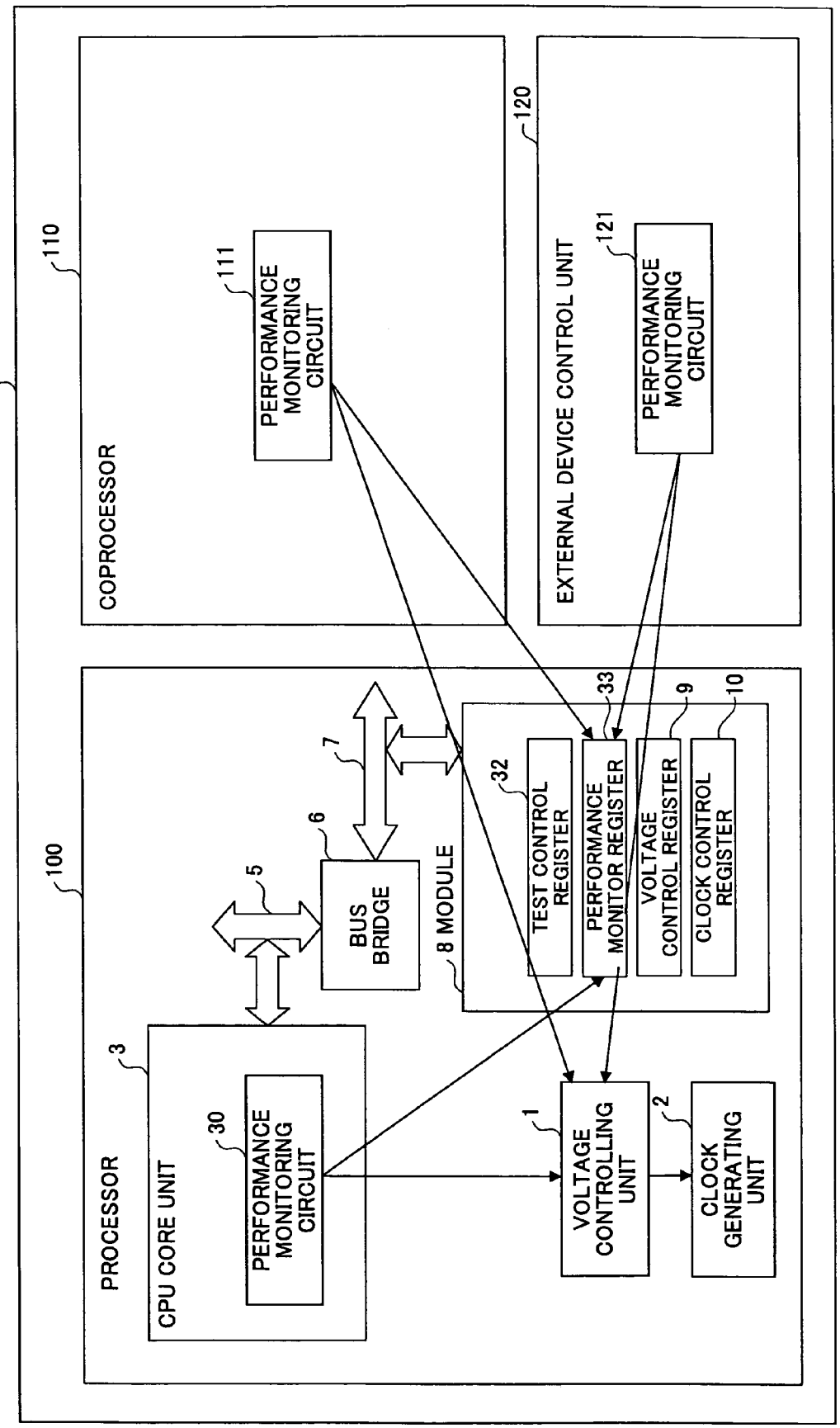
FIG. 6 is a block diagram showing an example of the construction of an embodiment of a system LSI to which the present invention is applied.

FIG. 6 is a block diagram showing an example of the construction of an embodiment of a system LSI to which the present invention is applied. A system LSI 200 of this embodiment includes a processor 100, a coprocessor 110, and an external device control unit 120, which are provided in a chip. The processor 100, the coprocessor 110, and the external device control unit 120 are modules having large circuit size and operating at different operating frequencies. Moreover, an operating voltage and a clock frequency can be controlled separately with respect to each of the large-scale modules of the processor 100, the coprocessor 110, and the external device control unit 120.

In the case of such construction, since voltage control is performed separately for each large-scale module, it is preferable to provide a performance monitor for checking an operating environment at each module. In the example of FIG. 6, the performance monitoring circuit 30, a performance monitoring circuit 111, and a performance monitoring circuit 121 are provided in the processor 100, the coprocessor 110, and the external device control unit 120, respectively. The performance monitoring circuits 111 and 121 may have the same construction as the performance monitoring circuit 30. As shown in FIG. 6, the performance monitoring circuits supply respective test results to the voltage controlling unit 1 and the performance monitor register 33. Although illustration is omitted, the operations of the performance monitoring circuits are controlled by respective control signals supplied from the voltage controlling unit 1 and the performance monitor register 33. FIG. 6 is illustrated such that the performance monitoring circuit 30 is provided inside the CPU core unit 3. Notwithstanding, the position of the performance monitoring circuit 30 may be inside or outside the CPU core unit 3.

In this embodiment, each module is configured to have a performance monitoring circuit. Alternatively, the test circuit 20 may be provided in place of the performance monitoring circuit. Further, power supply blocks may not be separate for each module. Even in such a case, a performance monitoring circuit (or test circuit) may be provided at each of such locations as expected to have a large voltage drop inside the chip.

Figure 7:
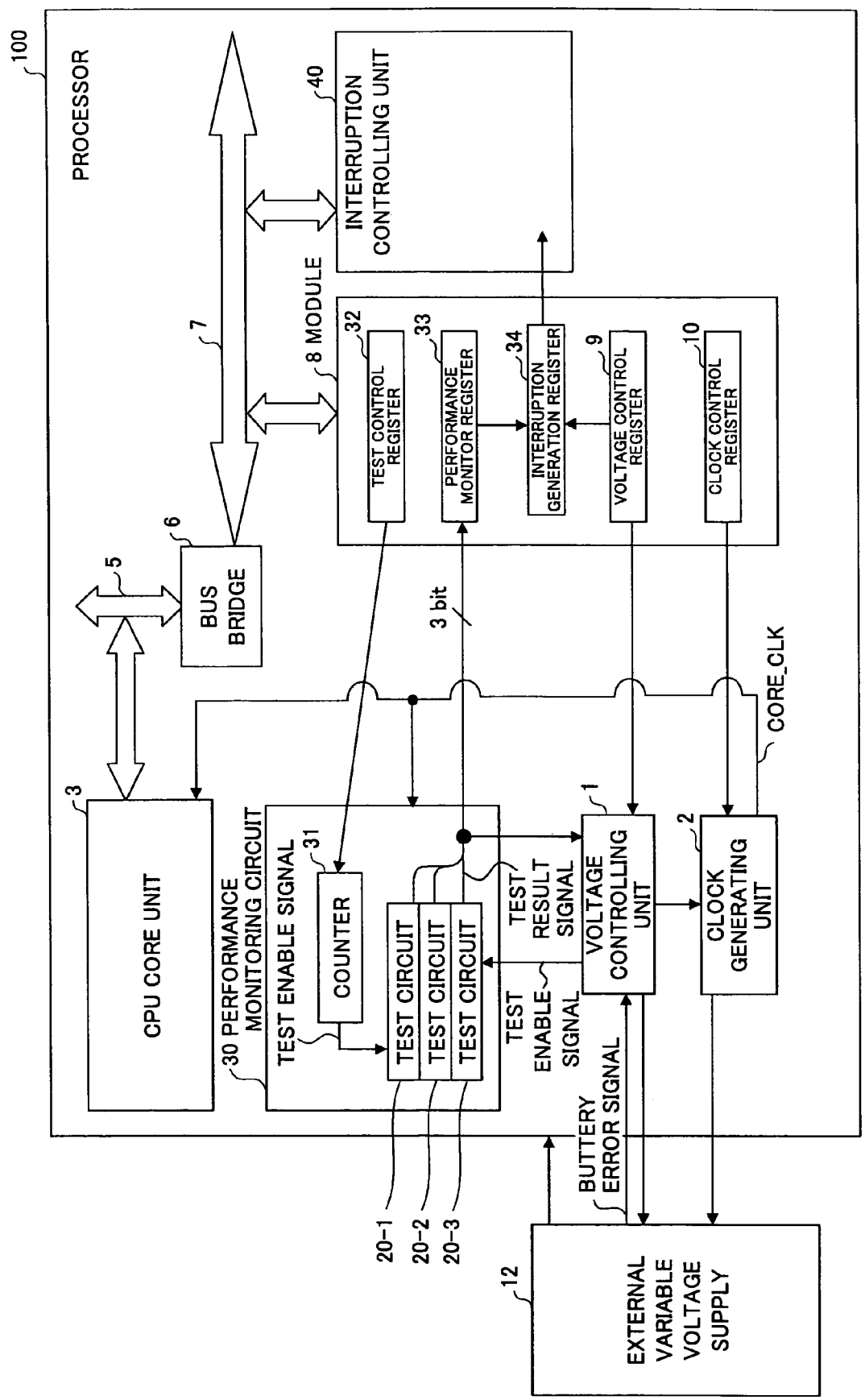
FIG. 7 is a block diagram showing an example of the construction of a third embodiment of the processor.

FIG. 7 is a block diagram showing an example of the construction of a third embodiment of the processor 100. In FIG. 7, the same elements as those of FIG. 5 are referred to by the same numerals, and a description thereof will be omitted.

The processor 100 of FIG. 7 includes an interruption controlling unit 40 in addition to the construction of FIG. 5. Moreover, the module 8 is provided with an interruption generation register 34 for the control of interruption operation of the interruption controlling unit 40. A battery error signal generated by the external variable voltage supply 12 is supplied to the voltage controlling unit 1. The voltage controlling unit 1 checks an operating condition based on the battery error signal supplied from the external variable voltage supply 12 or monitor results supplied from the performance monitoring circuit 30. Upon finding that the operating condition is unsafe, the voltage controlling unit 1 may assert an interruption directly to the CPU core unit 3, or may assert an interruption indirectly to the CPU core unit 3 through the interruption generation register 34 and the interruption controlling unit 40.

A choice of operations between the direct assertion of an interruption to the CPU core unit 3 and the indirect assertion of an interruption through the interruption controlling unit 40 may be made based on values stored in the voltage control register 9. Further, a choice of operations whether to perform a voltage control operation to raise an internal operating voltage in response to the finding by the voltage controlling unit 1 of an unsafe operating condition may also be made based on values stored in the voltage control register 9.

Figure 8:
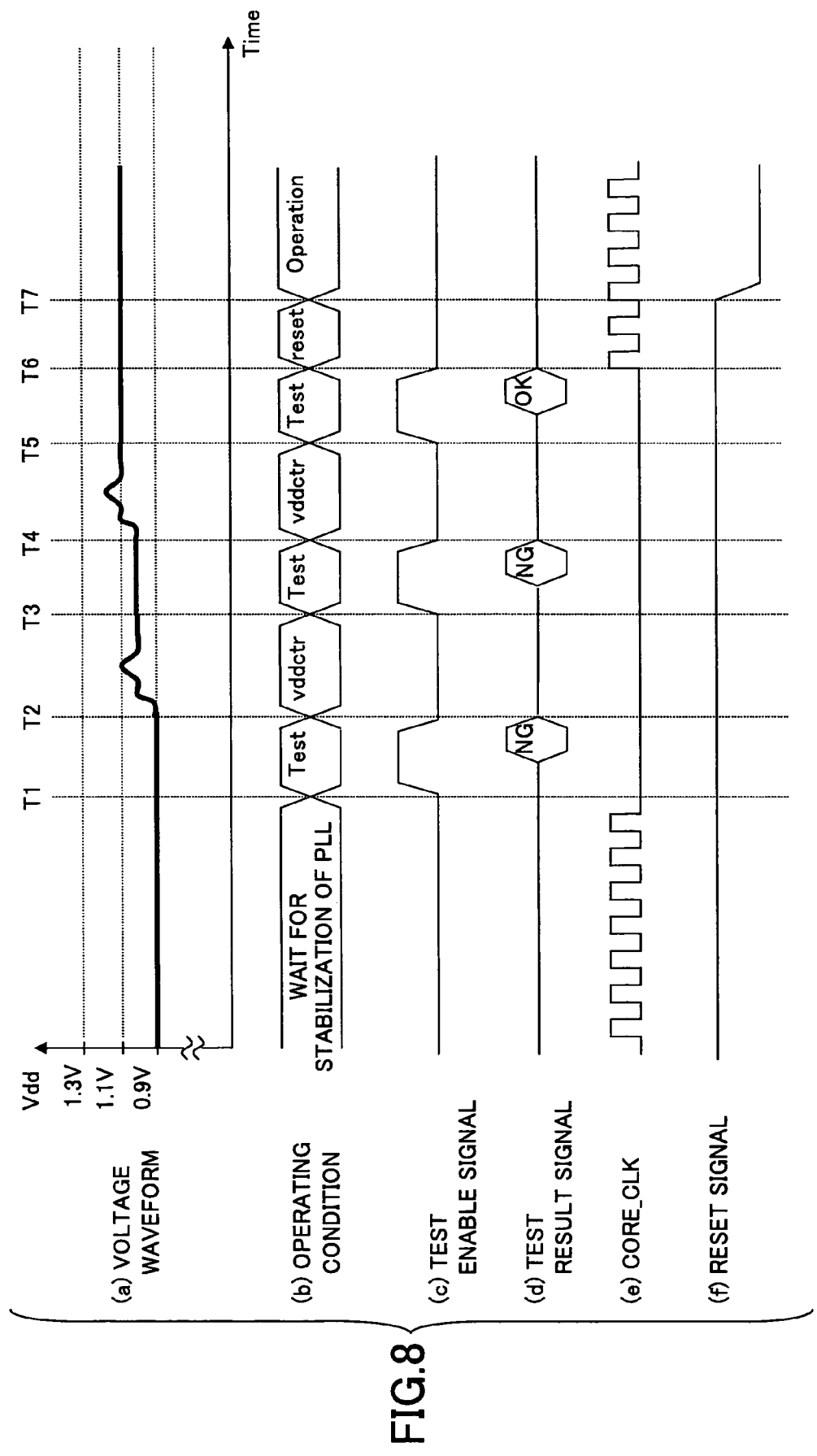
FIG. 8 is a timing chart showing another embodiment of the operation of the semiconductor integrated circuit according to the present invention.

FIG. 8 is a timing chart showing another embodiment of the operation of the semiconductor integrated circuit according to the present invention. The timing chart of FIG. 8 illustrates a case in which the internal operating voltage is set to a minimum necessary voltage for proper operation at the time of power-on reset of the chip of the processor 100.

A period prior to time T1 is a wait period for the stabilization of the PLL circuit 11. This period may be defined by keeping an external reset signal asserted to the voltage controlling unit 1, or may be defined by timing a fixed time period until the PLL circuit 11 is stabilized. Such timekeeping is carried out by a counter provided in the voltage controlling unit 1 or the clock generating unit 2. When the PLL wait period comes to an end, a test operation is performed during a period T1-T2 (FIG. 8 (*c*)). In the example shown in FIG. 8, the voltage of the external variable voltage supply 12 is set to 0.9 V in an initial condition after a reset is applied to the voltage controlling unit 1 from an exterior (FIG. 8 (*a*)). A test conducted in the period T1-T2 with this voltage level indicates an NG test result (FIG. 8 (*d*)), so that the internal operating voltage is raised in a period T2-T3, followed by another test operation performed in a period T3-T4. While this is done, the core clock signal CORE_CLK (FIG. 8 (*e*)) is in a suspended state, and an internal reset signal (FIG. 8 (*f*)) output from the voltage controlling unit 1 (or the clock generating unit 2) remains to be asserted. The same operations are repeated thereafter, and a test conducted in a period T5-T6 indicates an OK test result. In response, the supply of the clock signal resumes at time T6 (FIG. 8 (*e*)). It should be noted that since the internal reset signal (FIG. 8 (*f*)) is asserted, the supply of the clock signal may as well be started at earlier timing. In a period T6-T7, the internal reset signal remains to be asserted while the clock signals is supplied, thereby initializing circuitry for synchronization reset in the chip. At time T7, the reset signal is deactivated to commence a normal, routine operation.

In the description provided above, the internal reset signal is transmitted from the voltage controlling unit 1 or the clock generating unit 2. Alternatively, a separate module may be provided as an independent reset generating circuit, or the function to transmit such a signal may be provided in another block other than the voltage controlling unit 1 and clock generating unit 2.

In the present embodiment, an operation is started by deactivating an internal reset after the internal operating voltage is set to a voltage level (minimum necessary level) based on test operations performed by the test circuit at the time of power-on reset of the processor. Such function makes it possible to operate at a minimum necessary internal operating voltage from the start of an operation of the chip even if chips have performance variation attributable to manufacturing variation or the like. This achieves the reduction of power consumption optimum for each chip.

Figure 9:
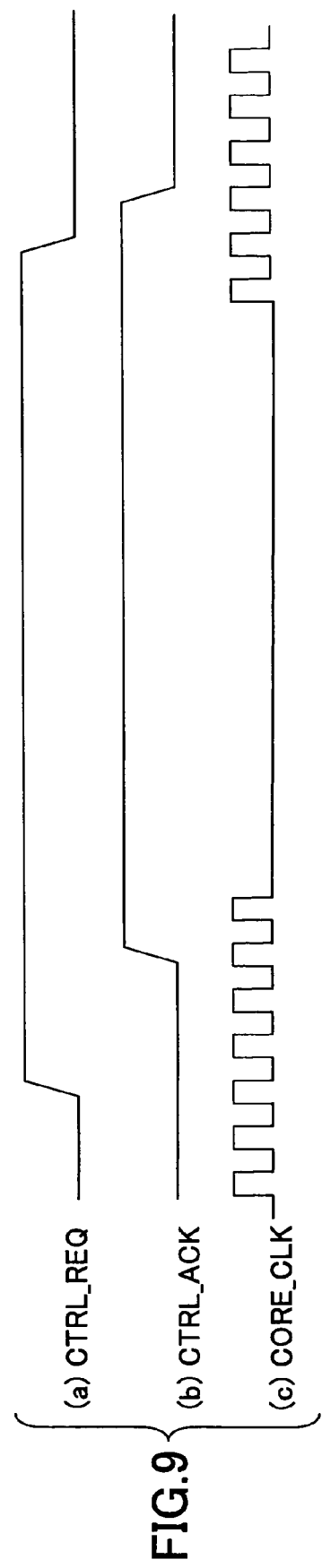
FIG. 9 is a timing chart for explaining a control operation relating to the suspension of a core clock signal.

FIG. 9 is a timing chart for explaining a control operation relating to the suspension of the core clock signal CORE_CLK. In the embodiments described heretofore, the supply of the core clock signal CORE_CLK is suspended at the time of a voltage change. Even if the core clock signal CORE_CLK is suspended during a bus access by the CPU core unit 3, however, there is a danger of the CPU core unit 3 suffering a hangup due to the loss of data on the bus if the clocks other than the one supplied to the CPU core unit 3 are not suspended.

In consideration of this, prior to the suspension of clock supply, a request signal CTRL_REQ is supplied from the clock generating unit 2 to the CPU core unit 3 to request the suspension of clock supply. Having received the request signal CTRL_REQ, the CPU core unit 3 suppresses any further bus requests after the completion of a current bus access for data transfer makes it possible to suspend clocks, and returns an acknowledge signal CTRL_ACK to the clock generating unit 2. The clock generating unit 2 suspends the supply of the core clock signal CORE_CLK after receiving the acknowledge signal CTRL_ACK.

The source of the request signal may alternatively be the voltage controlling unit 1 rather than the clock generating unit 2. The destination of the request signal may alternatively be the bus bridge 6 or a bus master such as a DMA controller connected to the on-chip bus 5, instead of the CPU core unit 3.

Figure 10:
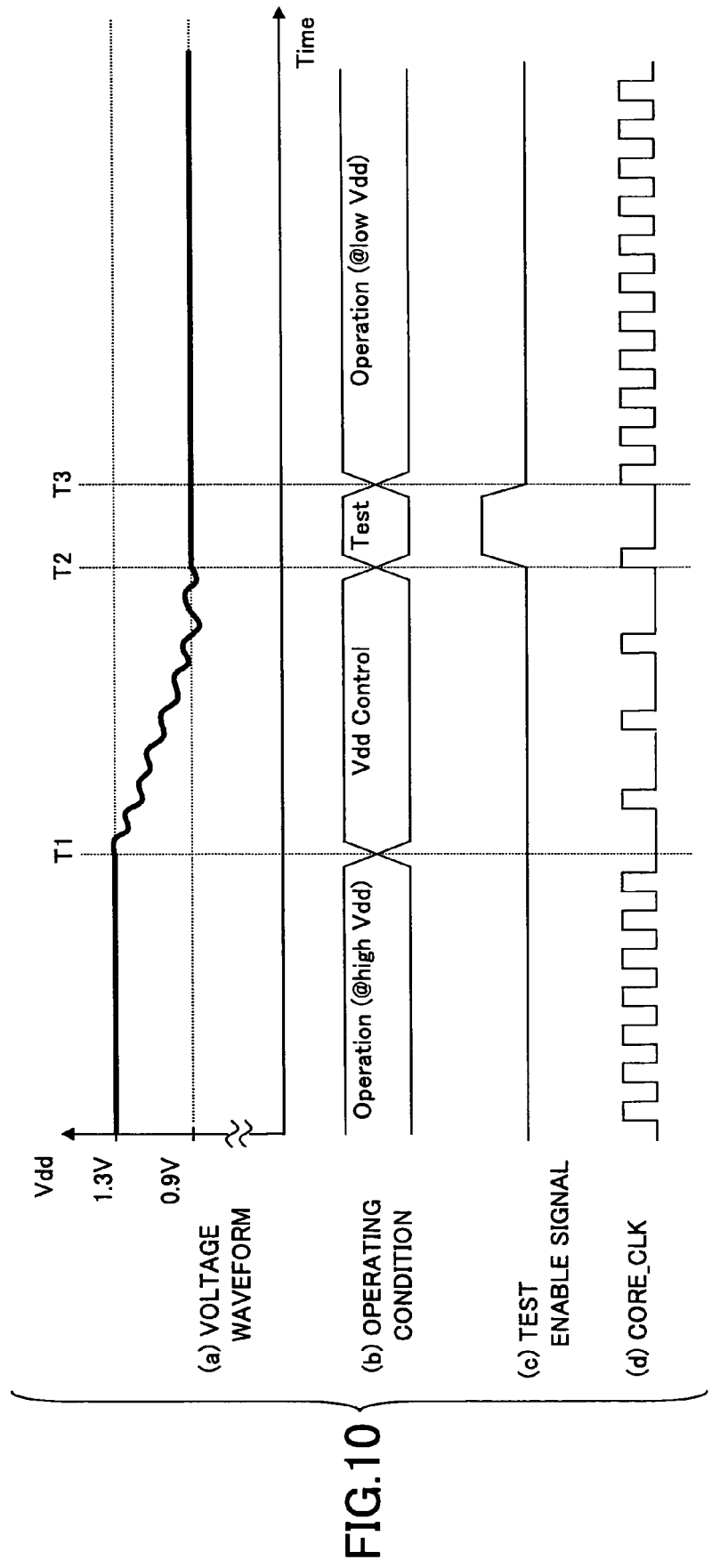
FIG. 10 is a timing chart showing another embodiment of a voltage control operation performed by the semiconductor integrated circuit according to the present invention.

FIG. 10 is a timing chart showing another embodiment of a voltage control operation performed by the semiconductor integrated circuit according to the present invention.

In the voltage control operation shown in FIG. 10, unlike the voltage control operation of FIG. 2, the core clock signal CORE_CLK is not suspended during a voltage change, but its clock frequency is lowered. With such lowering of the clock frequency, instructions can be executed with a relatively sufficient timing margin even if the internal operating voltage becomes unstable to some extent. This reduces a possibility of the CPU core unit 3 suffering a malfunction such as a hangup or the like.

Figure 11:
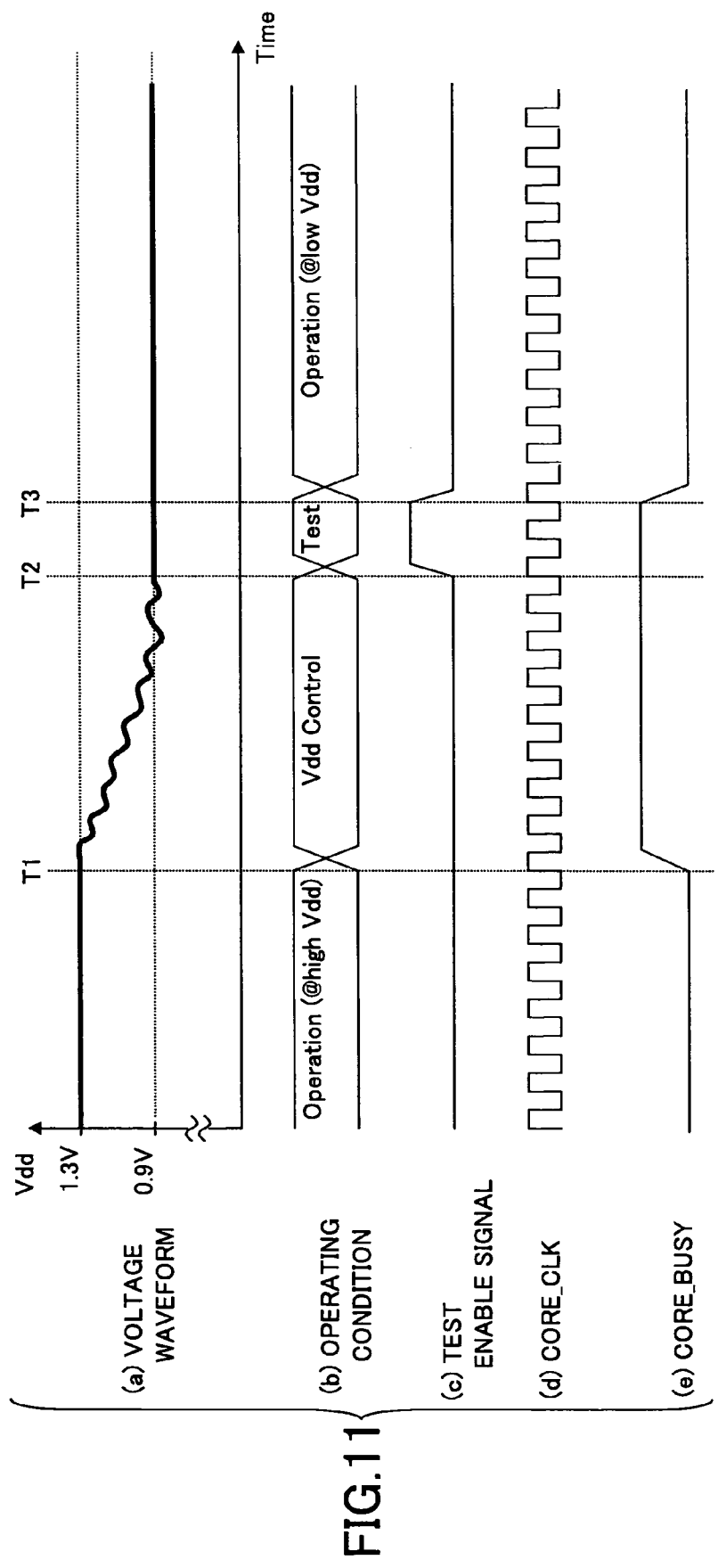
FIG. 11 is a timing chart showing yet another embodiment of the voltage control operation performed by the semiconductor integrated circuit according to the present invention.

FIG. 11 is a timing chart showing yet another embodiment of the voltage control operation performed by the semiconductor integrated circuit according to the present invention. In the voltage control operation of FIG. 11, the core clock signal CORE_CLK (FIG. 11 (*d*)) is not suspended even during a voltage change. Instead, a busy signal CORE_BUSY directed to the CPU core unit 3 is asserted during a period T1-T3. This busy signal CORE_BUSY may be supplied from the voltage controlling unit 1 to the CPU core unit 3. In response to the assertion of the busy signal CORE_BUSY, the CPU core unit 3 suspends the execution of instructions. With such a construction using a busy signal, malfunctions such as a hangup can be prevented during an unstable period in which the internal operating voltage is changed.

Figure 12:
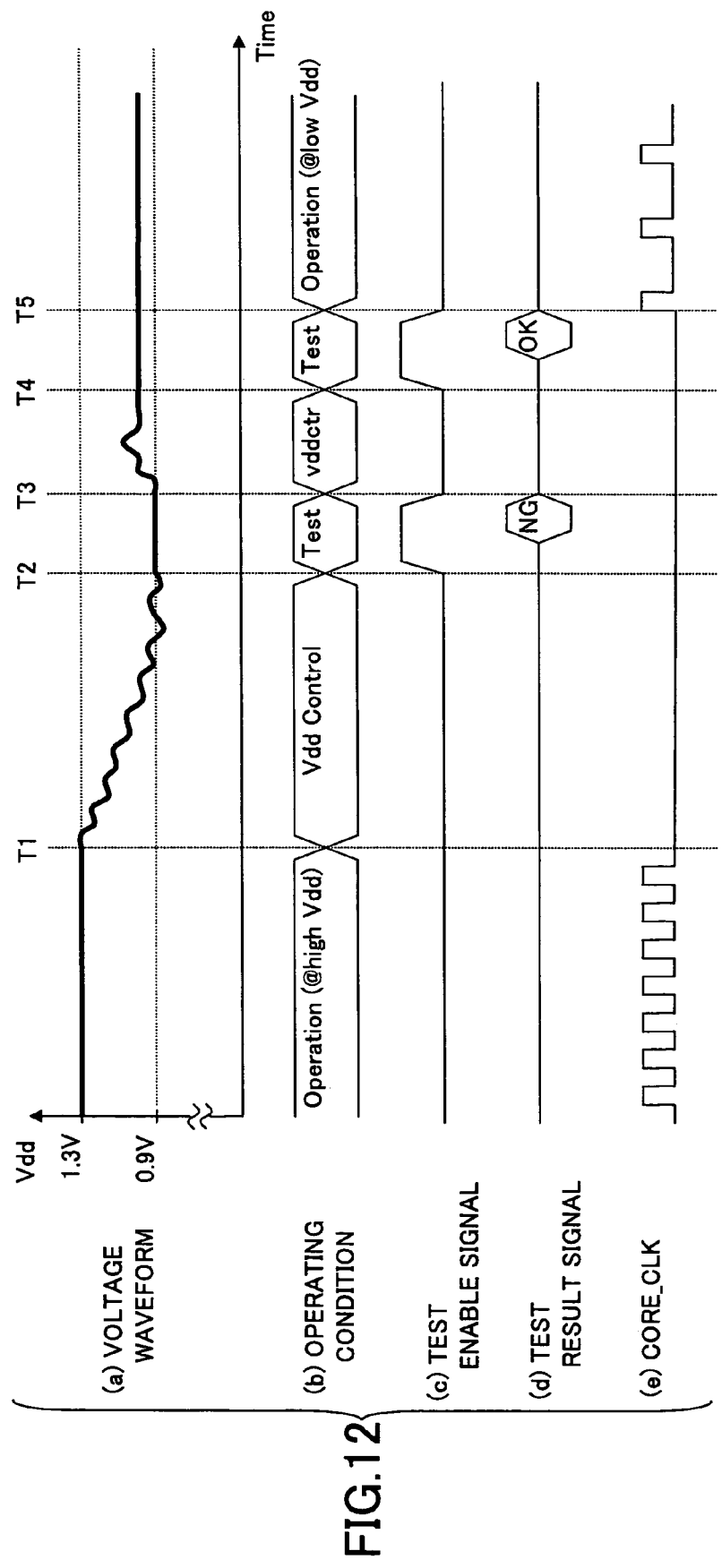
FIG. 12 is a timing chart showing still another embodiment of the voltage control operation performed by the semiconductor integrated circuit according to the present invention.

FIG. 12 is a timing chart showing still another embodiment of the voltage control operation performed by the semiconductor integrated circuit according to the present invention. Compared with the operation shown in FIG. 3, the operation shown in FIG. 12 differs in that a clock frequency for a normal routine operation following a voltage change is lower than a frequency used prior to the voltage change. Since the internal operating voltage in this case is set to a minimum necessary voltage for proper operation at the low frequency, further reduction in power consumption can be made compared with the operation of FIG. 3. In this case, test operations carried out in the period T2-T3 and the period T4-T5 are performed by use of the low frequency clock signal after the frequency change.

The change of the clock frequency is effected by the clock generating unit 2, and is controlled based on settings stored in the clock control register 10 or the like. Further, the above description was directed to an example in which the clock frequency is lowered. In the case of the gradual rise of the clock frequency, a control operation gradually raising the voltage may be performed until the test result of the test circuit indicates an OK test result.

Figure 13:
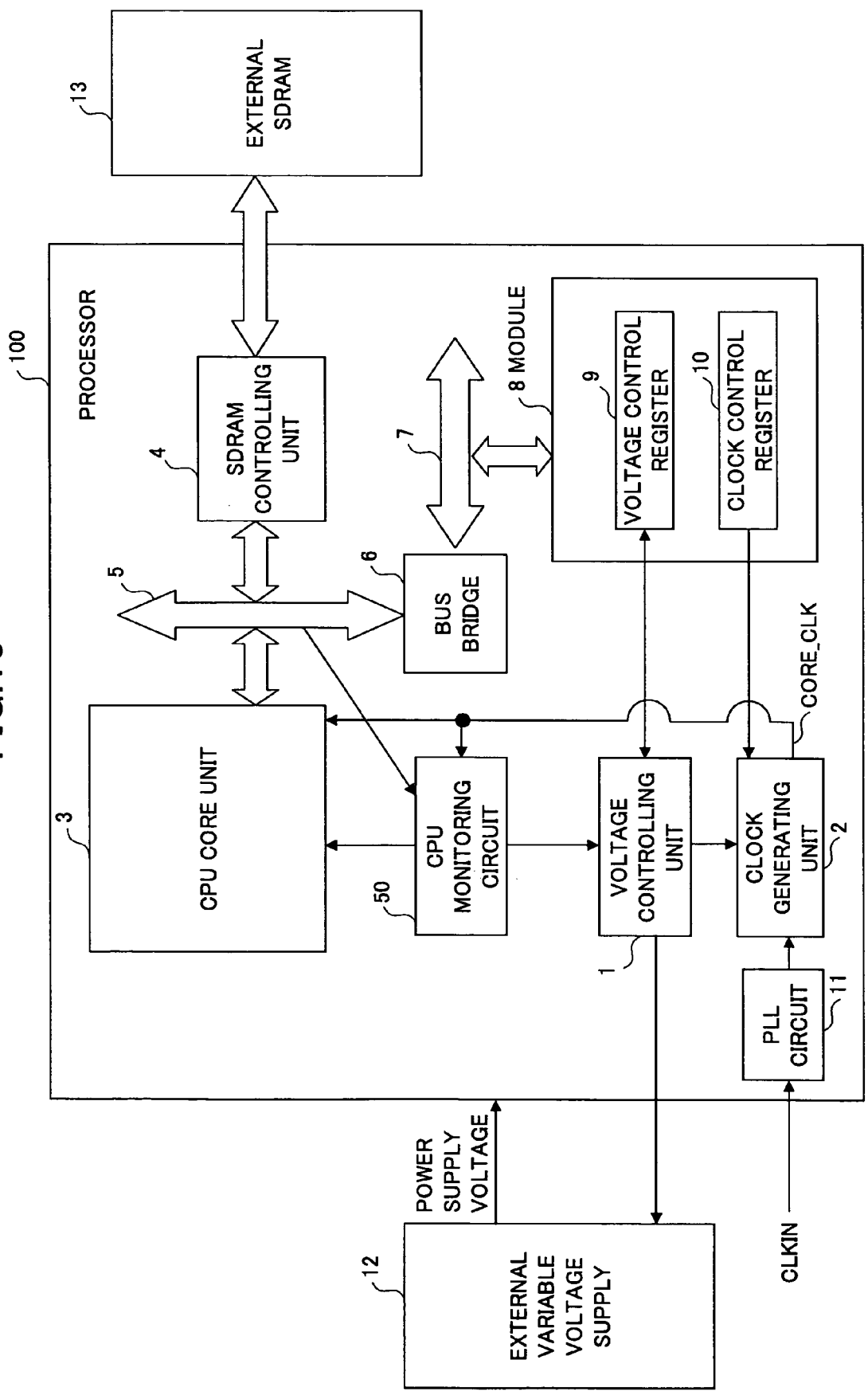
FIG. 13 is a block diagram showing the construction of yet another embodiment of the semiconductor integrated circuit according to the present invention.

FIG. 13 is a block diagram showing the construction of yet another embodiment of the semiconductor integrated circuit according to the present invention. The construction shown in FIG. 13 is provided for the purpose of copying with a case in which the CPU core unit 3 suffers a hangup. In FIG. 13, the same elements as those of FIG. 1 are referred to by the same numerals, and a description thereof will be omitted.

In FIG. 13, the processor 100 includes a CPU monitoring circuit 50. The CPU monitoring circuit 50 monitors a program counter that indicates an instruction-fetch address used for executing instructions in the CPU core unit 3. Alternatively, the CPU monitoring circuit 50 may monitor a bus request signal or the like of the on-chip bus 5. When the content of the program counter of the CPU core unit 3 or the bus request signal of the on-chip bus 5 does not change for a predetermined time period, the CPU monitoring circuit 50 transmits a reset requesting signal to the voltage controlling unit 1.

When neither the program counter nor the bus request signal changes for the predetermined time period, it is reasonable to assume that the CPU core unit 3 is suffering a hangup. Once the CPU core unit 3 suffers a hangup, the operation cannot be recovered through the recovery of a program even if the internal operating voltage is raised by the voltage controlling unit 1. When a hangup is detected, therefore, the CPU monitoring circuit 50 supplies the reset requesting signal to the voltage controlling unit 1. In response to the assertion of the reset requesting signal, the voltage controlling unit 1 forcibly resets each module inside the chip of the processor 100. Further, the voltage controlling unit 1 stores values indicative of resetting subsequent to a hangup in the voltage control register 9. Thereafter, the voltage controlling unit 1 sets the internal operating voltage to a level that is believed to be sufficiently high and safe, followed by deactivating a reset state to resume the chip operation from initial conditions.

A risk of suffering a hangup is high when the internal operating voltage is adjusted. Especially when the voltage is lowered, thus, it is desirable to evacuate necessary register values inside the chip to a memory such as an external SDRAM or the like prior to a voltage change. When initialization is triggered by resetting performed in the hangup state, a boot program reads the values of the voltage control register 9, thereby learning that the booting is initiated by resetting following a hangup. Based on this recognition, the CPU core unit 3 reads various register values or the like from the memory medium such as an external SDRAM, thereby recovering these register values so as to make it possible to resume the operation.

Prior to resuming operation after a reset, the control operation as that shown in FIG. 8 may be performed by using the test circuit of the present invention. This makes it possible to resume an operation at a proper internal operating voltage that does not cause a hangup.

FIG. 14 is a flowchart showing the operation of the processor 100 shown in FIG. 13. At step S1, the contents of necessary registers and the like are evacuated to an external memory or the like prior to a voltage control operation. At step S2, a voltage control operation such as the lowering of the internal power supply voltage or the like is performed. At step S3, an operation test is performed. This operation test is the test that is performed by the test circuit as described in connection with the embodiments of the invention. At step S4, a check is made as to whether a test result indicates OK. If the test result is not OK, the procedure goes back to step S2, at which the voltage is adjusted, followed by another test operation and the check of a test result.

If the test result is OK at step S4, the procedure proceeds to step S5, at which a normal operation is resumed. Namely, the operation of the processor 100 is resumed by use of the internal power supply voltage that is modified by the voltage control operation.

When the normal operation resumes, the CPU may hangup. This occurs when the internal operating voltage is lowered without suspending or decreasing the speed of the CPU clock at the time of voltage control, or when the test circuit runs without error by a fluke due to process variation despite the voltage that does not allow the CPU critical path to operate properly. In consideration of this, at step S6, a check is made as to whether a hangup is detected. This hangup detection is performed by the CPU monitoring circuit 50 as described in connection with FIG. 13.

If a hangup is detected at step S6, the procedure goes to step S7, at which a reset operation is performed. At step S8, a boot program executed by the CPU triggered by the reset operation learns that a hangup is a cause of the reset, and performs a process for returning the resister values or the like having been evacuated to the external memory or the like. The procedure then goes back to step S2 to perform the subsequent steps, thereby carrying out a voltage control operation, a test operation, and recovery to a normal operation.

Further, the present invention is not limited to these embodiments, but various variations and modifications may be made without departing from the scope of the present invention.

What is claimed is:

1. A semiconductor integrated circuit, comprising:
   a module configured to operate based on a clock signal;
   a voltage controlling unit configured to change a power supply voltage supplied to said module;
   a clock generating unit configured to supply the clock signal to said module; and
   a test circuit configured to operate at the power supply voltage based on the clock signal to emulate a delay of a critical path provided in said module, thereby testing whether said module properly operates at the power supply voltage,
   wherein said clock generating unit supplies a different signal, in place of the clock signal, to said module while said voltage controlling unit is changing the power supply voltage.

2. The semiconductor integrated circuit as claimed in claim 1, wherein said clock generating unit supplies a signal having a fixed signal level as the different signal to said module while said voltage controlling unit is changing the power supply voltage.

3. The semiconductor integrated circuit as claimed in claim 1, wherein said clock generating unit supplies a clock signal having a lower frequency than the clock signal as the different signal to said module while said voltage controlling unit is changing the power supply voltage.

4. The semiconductor integrated circuit as claimed in claim 1, wherein said clock generating unit resumes supply of the clock signal to said module in response to a positive test result obtained by said test circuit after completion of changing of the power supply voltage.

5. The semiconductor integrated circuit as claimed in claim 4, wherein said voltage controlling unit raises the power supply voltage, in response to a negative test result obtained by said test circuit after completion of changing of the power supply voltage, until a test result obtained by said test circuit indicates a positive result.

6. The semiconductor integrated circuit as claimed in claim 1 wherein said test circuit includes:
   a delay path configured to have a delay equivalent to a delay of the critical path provided in said module; and
   a check circuit configured to check whether a signal having propagated through said delay path can be correctly received in synchronization with the clock signal,
   wherein said test circuit tests whether said module properly operates at the power supply voltage, in response to the check by said check circuit as to whether the signal having propagated through said delay path can be correctly received in synchronization with the clock signal.

7. The semiconductor integrated circuit as claimed in claim 6, wherein said test circuit includes a plurality of sets each comprised of said delay path and said check circuit, and the delay paths of said plurality of sets have respective, different delays.

8. The semiconductor integrated circuit as claimed in claim 7, further comprising a register configured to store a test result obtained by said test circuit, wherein said module is configured to access said register by executing one or more instructions.

9. The semiconductor integrated circuit as claimed in claim 7, wherein said test circuit periodically performs the testing.

10. The semiconductor integrated circuit as claimed in claim 9, wherein said voltage controlling unit controls the power supply voltage in response to a test result obtained by said test circuit.

11. The semiconductor integrated circuit as claimed in claim 9, further comprising an interruption controlling unit configured to generate an interruption directed to said module in response to a test result obtained by said test circuit.

12. The semiconductor integrated circuit as claimed in claim 1, further comprising:
   a plurality of power supply blocks each controllable separately to set respective power supply voltages; and
   test circuits provided in each of said plurality of power supply blocks.

13. The semiconductor integrated circuit as claimed in claim 1, wherein said voltage controlling unit controls the power supply voltage while allowing said test circuit to perform the testing following a power-on reset of said semiconductor integrated circuit.

14. The semiconductor integrated circuit as claimed in claim 1, wherein said clock generating circuit changes a frequency of the clock signal before and after said voltage controlling unit changes the power supply voltage.

15. The semiconductor integrated circuit as claimed in claim 1, wherein said module is a core circuit.

16. The semiconductor integrated circuit as claimed in claim 1 wherein said module is an interface circuit coupled to an external peripheral circuit including an external memory.

17. A semiconductor integrated circuit, comprising:
   a module configured to operate based on a clock signal;
   a voltage controlling unit configured to change a power supply voltage supplied to said module;
   a clock generating unit configured to supply the clock signal to said module; and
   a test circuit configured to operate at the power supply voltage based on the clock signal to emulate a delay of a critical path provided in said module, thereby testing whether said module properly operates at the power supply voltage,
   wherein said voltage controlling unit asserts a busy signal to said module to suspend an operation of said module while said voltage controlling unit is changing the power supply voltage.

18. A semiconductor integrated circuit, comprising:
   a core circuit configured to operate, based on a clock signal, to execute one or more instructions;
   a voltage controlling unit configured to change a power supply voltage supplied to said core circuit;
   a monitor circuit configured to detect a hangup of said core circuit;
   said core circuit being reset in response to the detection of the hangup by said monitor circuit; and
   a test circuit configured to operate at the power supply voltage based on the clock signal to emulate an operation of said core circuit, thereby testing whether said core circuit properly operates at the power supply voltage, said voltage controlling circuit controlling the power supply voltage at a time of the reset while said test circuit is performing the testing.

* * * * *

UNITED STATES PATENT AND TRADEMARK OFFICE
CERTIFICATE OF CORRECTION

PATENT NO. : 7,392,413 B2 Page 1 of 1
APPLICATION NO. : 10/967192
DATED : June 24, 2008
INVENTOR(S) : Takashi Shikata It is certified that error appears in the above-identified patent and that said Letters Patent is hereby corrected as shown below:

Title Page, Column 2 (Foreign Patent Documents), Line 1, change "2/1991" to --2/2001--.

Title Page, Column 2 (Other Publications), Line 2, change "Compputers" to --Computers--.

Signed and Sealed this

Seventh Day of October, 2008

JON W. DUDAS
*Director of the United States Patent and Trademark Office*